United States Patent [19]

Houck

[11] 4,196,040

[45] Apr. 1, 1980

[54] APPARATUS FOR REMOVING REPRINT PHOTOGRAPHIC FILMS FROM A CARRIER STRIP

[75] Inventor: Stephen R. Houck, Amity, Oreg.

[73] Assignee: Byers Photo Equipment Co., Inc., Portland, Oreg.

[21] Appl. No.: 879,260

[22] Filed: Feb. 21, 1978

[51] Int. Cl.$^2$ .......................... B32B 35/00; B32B 7/12

[52] U.S. Cl. .................................... 156/584; 156/344; 221/73

[58] Field of Search ............... 156/584, 344, 379, 247, 156/443, 459, 494, 538; 221/25, 26, 73; 354/340, 344; 355/3 SH, 75; 271/8 R, DIG. 2, 174; 242/67.1, 67.2

[56] References Cited

U.S. PATENT DOCUMENTS

| | | | |
|---|---|---|---|
| 2,754,994 | 7/1956 | Cole | 156/584 X |
| 3,026,239 | 3/1962 | Porter | 156/584 |
| 3,040,802 | 6/1962 | Frazer | 156/584 |
| 3,266,797 | 8/1966 | Stievenart | 156/584 X |
| 3,507,726 | 4/1970 | Crew | 156/584 X |
| 3,640,204 | 2/1972 | Gordon | 156/584 X |
| 3,727,815 | 4/1973 | Schwartz | 156/584 X |

*Primary Examiner*—William A. Powell
*Assistant Examiner*—Thomas Bokan
*Attorney, Agent, or Firm*—Eugene D. Farley

[57] ABSTRACT

Individual photographic films are removed from a composite film comprising a flexible carrier strip or strips to which the films have been adhesively bonded along one edge or both edges during the production of reprint photographs, by inserting a deflector under the film while bending the carrier strip around a corner to stretch the adhesive, thereby separating the film from the carrier strip.

The apparatus employed comprises an elongated frame mounting the composite film, drive means for driving the composite film the length of the frame, guide means including a corner for guiding the movement of the film, and deflector means positioned adjacent the corner for insertion under the film and moving it angularly with respect to the carrier strip as the strip moves around the guide corner, thereby separating the film from the carrier strip.

9 Claims, 36 Drawing Figures

APPARATUS FOR REMOVING REPRINT PHOTOGRAPHIC FILMS FROM A CARRIER STRIP

BACKGROUND AND GENERAL STATEMENT OF THE INVENTION

My invention pertains to method and apparatus for the separation of photographic films from a carrier strip employed in the production of film reprints i.e. to a "reprint film take-off unit".

In the photo finishing industry it is common practice for the customer to order reprints from films previously developed. When so doing, he physically separates the films to form individual films to be reprinted or, in the alternative, marks selected films in a group of the same for the purpose of indicating which members of the group he wishes reprinted. He then places the individual films, or groups of films, in an envelope together with an order indicating the number of reprints to be made of each of the selected films.

In the photo finishing shop it is necessary to assemble these films in a manner such that the reprinting may be done and the order filled rapidly and accurately. This is accomplished by in effect reconstituting a film comprising numerous units into a length which may be processed in the automated printing machinery of the shop.

To achieve this purpose there is provided a flexible carrier strip of paper or plastic which has a width substantially identical to the width of the original film. To this carrier strip are affixed the reprint film units by means of an adhesive which releasably bonds them to the strip.

The carrier strip-film unit assembly then is passed through the automated film printing apparatus at high speed, for example a speed of from 2,000 to 3,000 films per hour. This results in the production of the desired number of photographic prints.

It then remains to separate the film units from the backing strip, to correlate them with the prints which have been made from them, and package both in an envelope which is returned to the customer.

These operations obviously are tedious and time consuming if performed by hand, and present situations in which it is easy for the operator to make mistakes. There presently is not automated machinery available which can accomplish the film removal at a speed and with an accuracy which is compatible with the automatic reprinting operation. It is the general object of the present invention to provide method and apparatus which will achieve this purpose.

Another object of this invention is the provision of a reprint film take off unit which will remove film from a backing strip to which it is adhesively secured at a high rate of speed.

Another object of this invention is the provision of a film take-off unit which will remove film units from a backing strip to which they are adhesively united at a high rate of speed without damaging the film.

Another object of this invention is the provision of a film take-off unit of the character described which provides means for viewing the film as it is removed from the carrier strip, thereby expediting its correlation with the corresponding reprints.

Another object of this invention is a film take-off unit which provides a constant travel speed across a film viewing screen.

Another object of this invention is the provision of a film take-off unit provided with adjustable guide means for guiding the progress of the reprint film-carrier strip assembly as it moves through the unit.

Another object of this invention is the provision of a film take-off unit wherein the films are positioned for ready retrieval following separation from the carrier strip.

Another object of this invention is the provision of a film take-off unit adaptable to various reprint film-carrier strip assemblies independently of the exact mounting position of the film relative to the carrier strip.

Another object of this invention is the provision of a film take-off unit adaptable to film-carrier strips employing a carrying strip on both film edges.

Another object of this invention is the provision of a film take-off unit adaptable to film carrier-strip assemblies of varying widths.

Still another object of this invention is the provision of a film take-off unit wherein the film is separated from the carrier strip to which it is adhesively secured by bending the strip and wherein the degree of bending of the carrier strip at the point of film removal is maintained constant.

Broadly considered, the foregoing and other objects of this invention are accomplished by a method which comprises providing a flexible carrier strip or strips to which one or more reprint film units are adhesively attached on one or both edges, moving the assembly of carrier strip and reprint films relative to a support, inserting a deflector behind the film units, one at a time in progressive sequence, continuing relative movement of the assembly and the support while bending the carrier strip around a corner, thereby separating the leading edges of each film unit in turn, and continuing relative movement of the carrier-film strip assembly to complete separation of the film unit from the carrier strip.

The objects of the invention are further achieved by providing apparatus for accomplishing the foregoing functions.

DESCRIPTION OF PREFERRED EMBODIMENTS OF THE INVENTION

Single Carrier Strip-Film Assembly

Figures 1, 2, 3A, 3B:
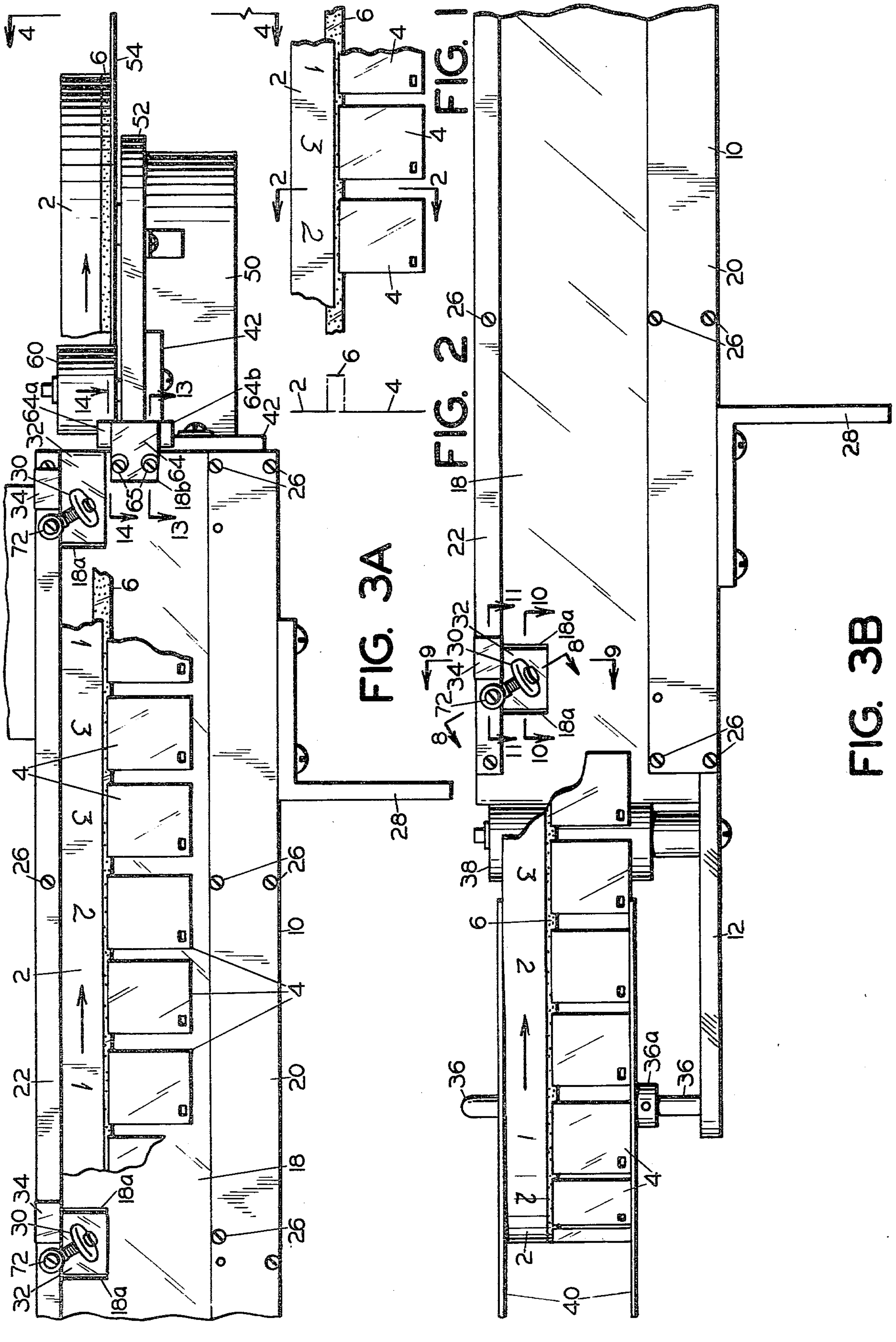
FIG. 1 is a plan view of the carrier strip, the film and the bonding adhesive, forming the carrier strip-film assembly.
FIG. 2 is an exploded view taken along the line 2—2 of FIG. 1.
FIG. 3A is a front elevation view of the right hand or discharge end of the film take-off unit containing the film take-off wedge and takeup reel.
FIG. 3B is a front elevation view of the left hand or feed end of the unit with the carrier film strip assembly reel.
Figure 4:
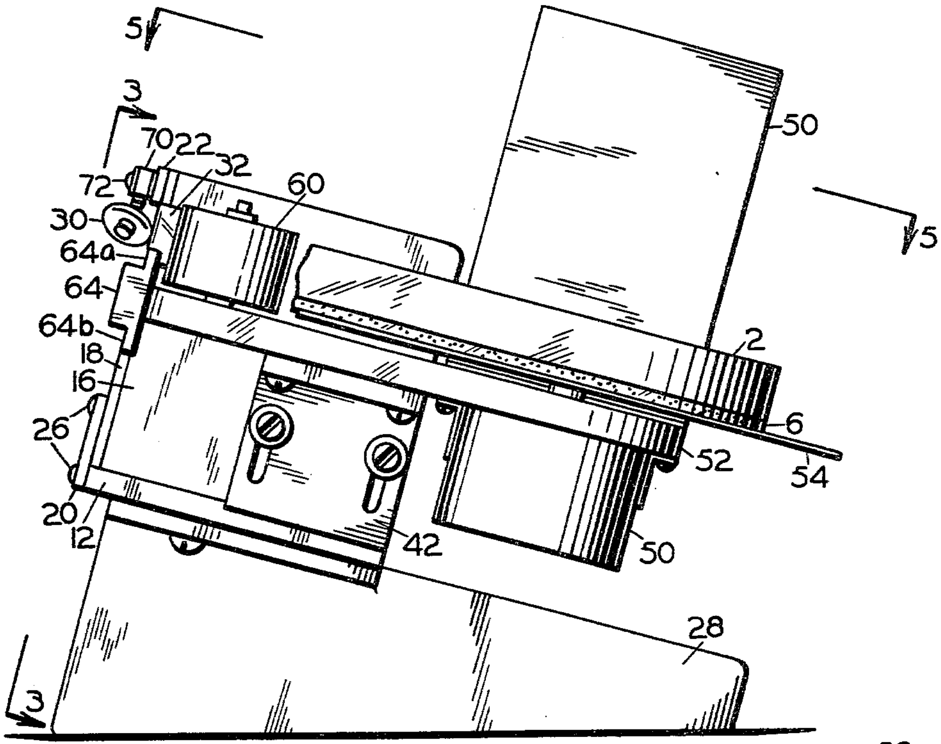
FIG. 4 is an end elevation view indicated by the line 4—4 of FIG. 3A.
Figure 7:
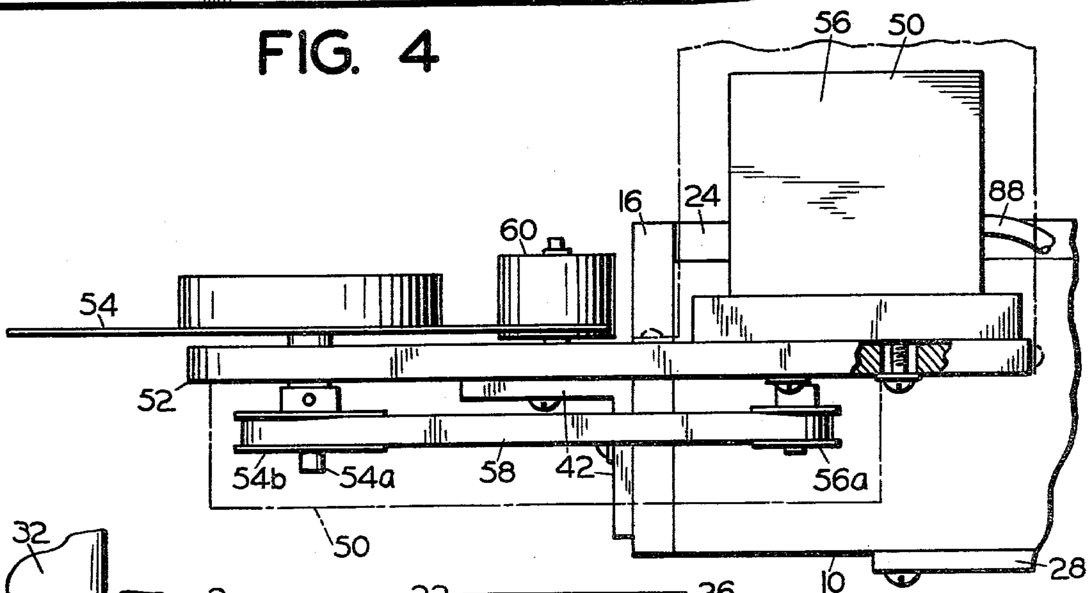
FIG. 7 is a rear elevation view of the power drive and take-up reel as indicated by the line 7—7 of FIG. 5.
Figure 18:
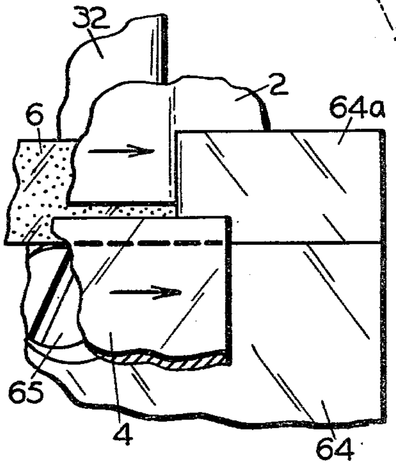
FIG. 18 is a fragmented elevation viewed along the line 18—18 of FIG. 17.

As shown in FIGS. 1 and 2, the carrier strip film assembly employed in this invention comprises a flexible carrier strip 2, picture films 4 in side-by-side relation, and an adhesive bonding material 6 forming a continuous composite carrier film strip for transporting films through a printer for making reprints.

Figure 5:
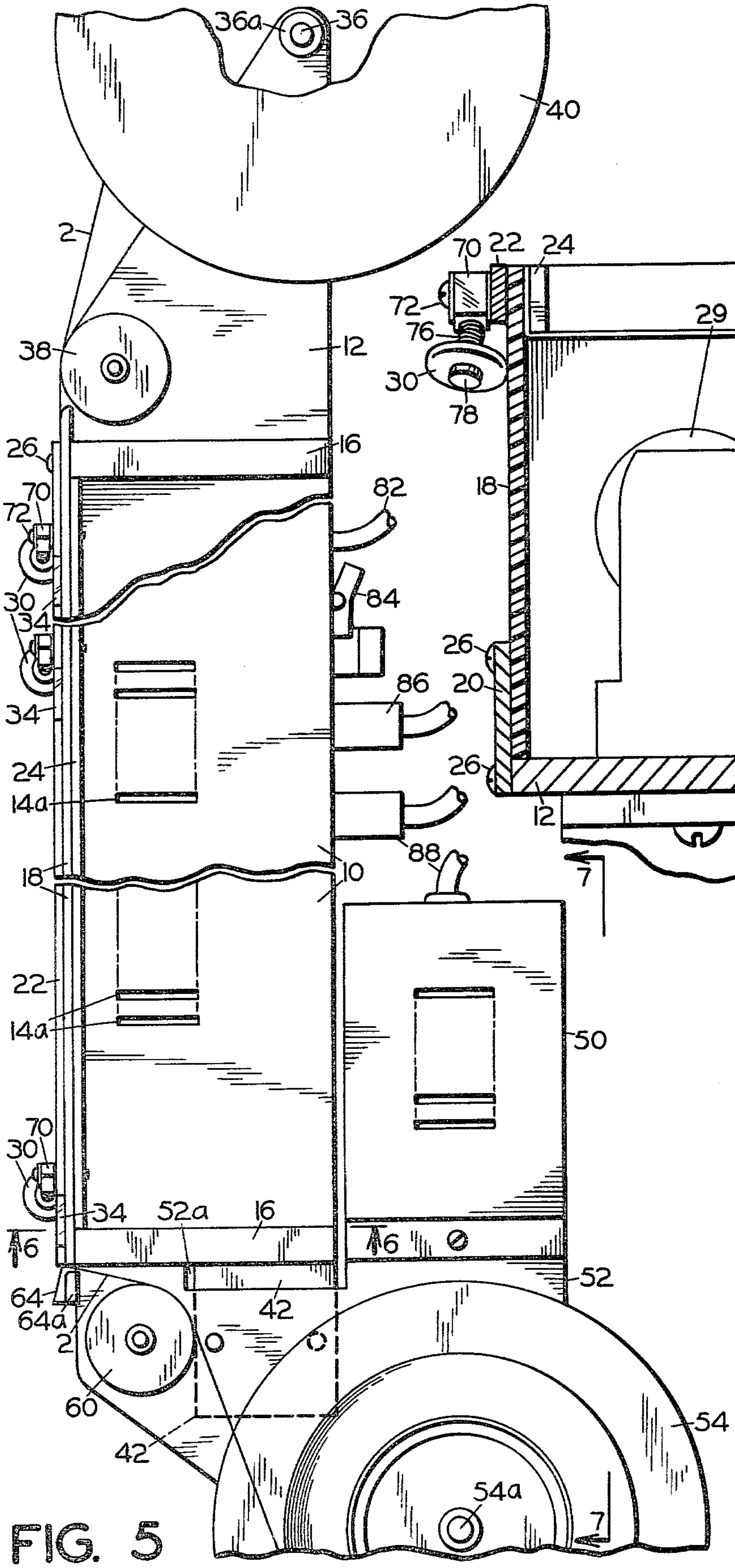
FIG. 5 is a fragmented plan view of the film take-off unit.
Figure 6:
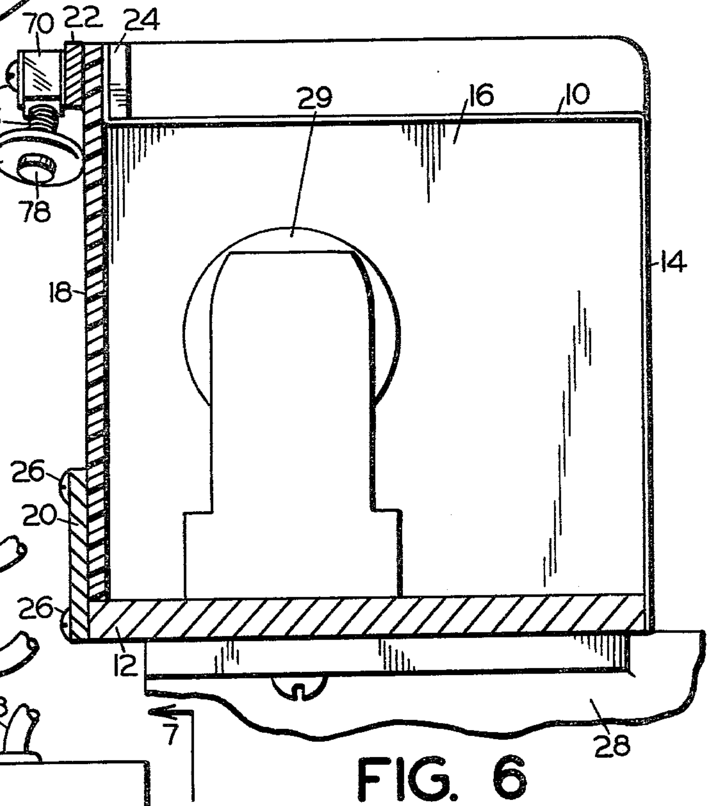
FIG. 6 is a cross sectional elevation along the line 6—6 of FIG. 5.

My invention for removal of the individual films from the carrier strip 2 comprises an elongated box-like frame 10, FIGS. 3, 5 and 6, providing a viewing screen, a film take-off, a feed reel and a power driven takeup reel.

The box-like frame comprises a base 12, an angular member 14 forming the top and back, ends 16, and a translucent front screen 18. The translucent screen is secured to the base 12 by longitudinal bar 20 and to the angular member 14 by longitudinal bars 22 and 24 by means of screws 26. The longitudinal bars 20 and 22 provide a lower and upper guide bar which in combination with the translucent screen 18 form an elongated guide throughout the length of the unit. The box-like frame is supported on a pair of legs 28.

Mounted within the elongated box 10 is a conventional single-tube fluorescent light 29 to illuminate the translucent screen 18 for film viewing. Ventilation is provided by slots 14*a*, FIG. 5.

Mounted on the guide bar 22 are three (3) pressure rollers 30, mounted with the axes of rotation at an angle to the guide bar 22 in such a manner that as the carrier strip 2 passes between the pressure roller 30 and the translucent screen 18, the carrier strip is forced upward against the guide bar 22 by the rotation of the roller 30. Details of the roller assembly will be described later.

Figure 10:
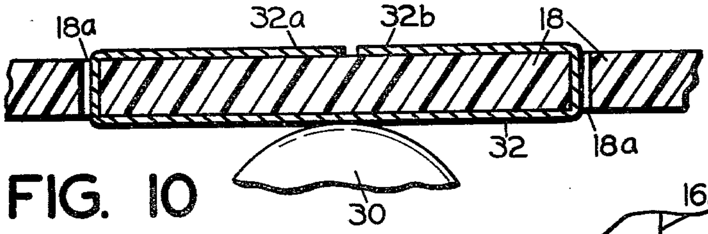
FIG. 10 is a fragmented cross section along the line 10—10 of FIG. 3B.

To reduce friction between the carrier strip 2 and the face of the translucent screen 18 a Teflon strip 32, FIGS. 3A and 10, is positioned behind the roller 30 in slots 18*a* in the translucent screen. The free ends 32*a* and 32*b* of the Teflon strip are secured to the back side of the screen 18 by adhesive.

Figure 11:
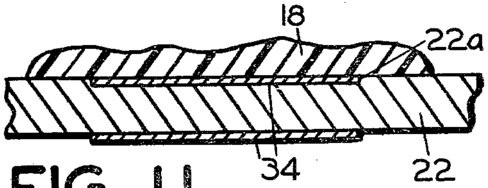
FIG. 11 is a fragmented cross section along the line 11—11 of FIG. 3B.

To reduce upward friction between the carrier strip 2 and the guide bar 22 adjacent the roller 30 a Teflon strip 34, FIGS. 3A and 11, is secured around the guide bar. The guide bar 22 is provided with a recessed section 22*a* on the back side to receive the Teflon strip 34, thereby providing continuous contact of the guide bar with the translucent screen 18.

At the left, or feed end of the elongated box-like frame 10, FIGS. 3B and 5, the bottom 12 is extended to provide mountings for the take-off reel spindle 36 and guide roller 38. The take-off reel 40 containing the carrier film strip assembly is positioned in vertical elevation to align the carrier strip 2 with the guide bar 22 by positioning collar 36*a* on spindle 36. The power drive and take-up reel for the carrier strip 2 is an integral assembly 50, FIGS. 3A, 4, 5 and 7, mounted on the right hand or discharge end of the elongated box-like frame 10 by bracket 42.

The power drive assembly 50 is supported on a base 52 with the carrier strip 2 take-up reel 54 positioned at one end and supported by a vertical shaft 54*a* containing the pulley 54*b*. The drive motor 56 with its drive pulley 56*a* is positioned at the opposite end of the base 52 with a belt 58 providing the drive for the take-up reel 54. A carrier strip guide roll 60 is supported on the base 52. The guide roll 60 causes and maintains a sharp bend in the carrier strip at the discharge end independent of the amount of carrier strip on the take-up reel.

Figure 12:
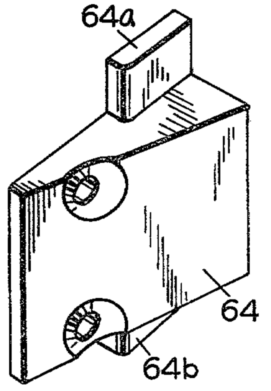
FIG. 12 is an isometric view of the film deflector.
Figure 13:
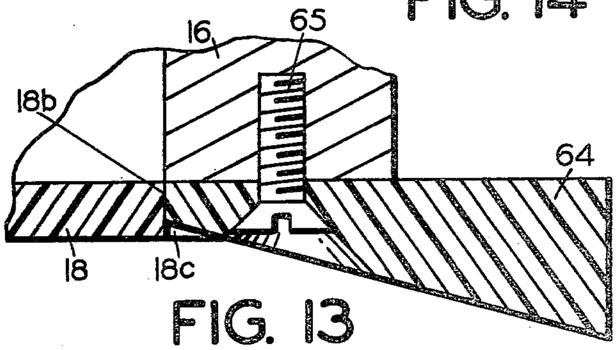
FIG. 13 is a fragmented cross section along the line 13—13 of FIG. 3A.

A film-removing station is located at the discharge end of the box-like frame 10. At this station, the translucent screen 18 is provided with a notch 18*b*, FIG. 19, permitting wedge-shaped film deflector 64, FIG. 12, to be mounted on right hand end member 16, FIG. 13. The film deflector 64 is provided with vertically upward and downward extending film guides 64*a* and 64*b* the front edges of which align with the front of the viewing screen 18, FIG. 5. Between the deflector 64 and guide bars 20 and 22 the translucent screen forms a support 18*c* for the carrier strip 2 and provides a small radius corner 18*d* around which the Teflon strip 32 is formed to provide a relatively sharp corner for the carrier strip 2 to pass, as explained in describing the operation.

Figure 8:
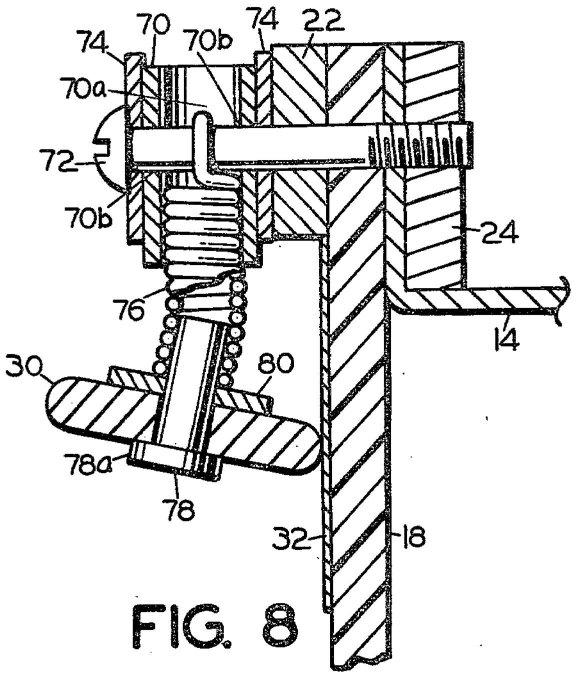
FIG. 8 is a cross section elevation view along the line 8—8 of FIG. 3B.
Figure 9:
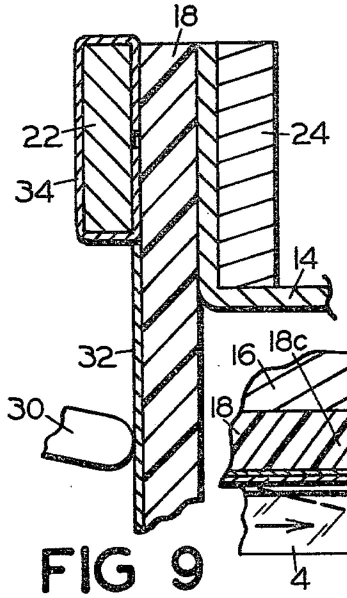
FIG. 9 is a fragmented cross sectional elevation along the line 9—9 of FIG. 3B.

The pressure roller 30 previously mentioned is supported on an assembly, FIG. 8, comprising a cube 70 with a vertical hole 70a and a hole 70b transverse to the hole 70a through which a mounting screw 72 passes to secure the assembly to the guide bar 22 by engagement with the bar 24. Washers 74 are provided on each side of the cube 70 to permit proper positioning of the roller 30 axis.

Positioned within the hole 70a is a tightly coiled spring 76, the loop end of which surrounds the screw 72, thereby holding the spring in position. Inserted in the free end of the spring 76 is a spindle 78 providing an axle for roller 30. A shoulder 78a of the spindle in combination with the washer 80 provides axial restraint for the roller 30. The diameter of the roller 30 is large enough to cause the spring 76 to deflect when the roller is in contact with the Teflon facing 32 of the translucent screen 18 thereby providing roller pressure against the carrier strip 2.

Power to the film take-off unit is supplied by a power cable 82, FIG. 5, through a switch 84 positioned in the vertical portion of the angular member 14. A foot control for the power unit is provided by plug 86 with the electrical circuit to the power drive being provided by plug and cord 88.

Figure 19:
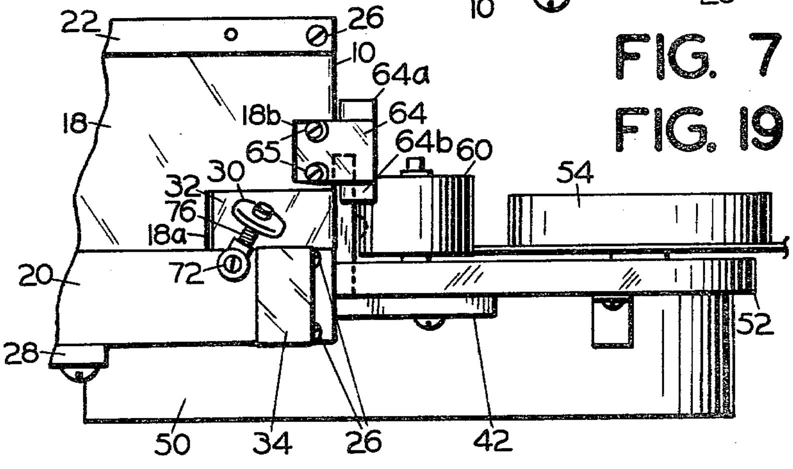
FIG. 19 is a vertical elevation of the film discharge end showing an alternate position of the pressure rollers and takeup reel.

In the event the carrier film strip is wound on the feed reel 40 in a reverse manner due to the processing technique involved, placing the carrier strip 2 on the bottom and the films 4 on the top, the collar 36a of spindle 36 FIG. 3B may be lowered so that the bottom edge of the carrier strip 2 engages the upper edge of guide bar 20. In this event the power drive support bracket 42 FIG. 19 is inverted to extend above the base 52 through notch 52a permitting the power unit to be lowered so that the takeup reel 54 aligns with the upper edge of the lower guide bar 20.

The pressure rollers 30 are transferred from the upper guide bar 22 to the lower guide bar 20 and set at an angle providing for the roller action to force the edge of the carrier strip 2 against the guide bar 20. The lower edge of the deflector 64 and the lower film guide 64b function in combination with the lower corner 18d of the support 18c in the same manner as previously explained for the normal positions.

Double Carrier Strip-Film Assembly

Figure 20:
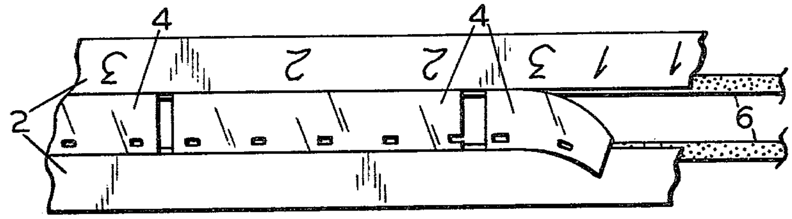
FIG. 20 is a plan view of the carrier strips, the film and the bonding adhesive, forming the double carrier strip-film assembly.

The alternate arrangement shown in FIGS. 20 through 36 is adapted to use a double carrier strip-film assembly, FIG. 20. It is equally adapted to use the single carrier strip-film assembly shown in FIG. 1.

As shown in FIG. 20 the carrier strip-film assembly comprises a pair of flexible carrier strips 2, picture films 4 in side-by-side relationship and adhesive bonding materials 6 forming a continuous composite double carrier strip-film assembly for transporting films through a printer for making reprints.

Figure 21:
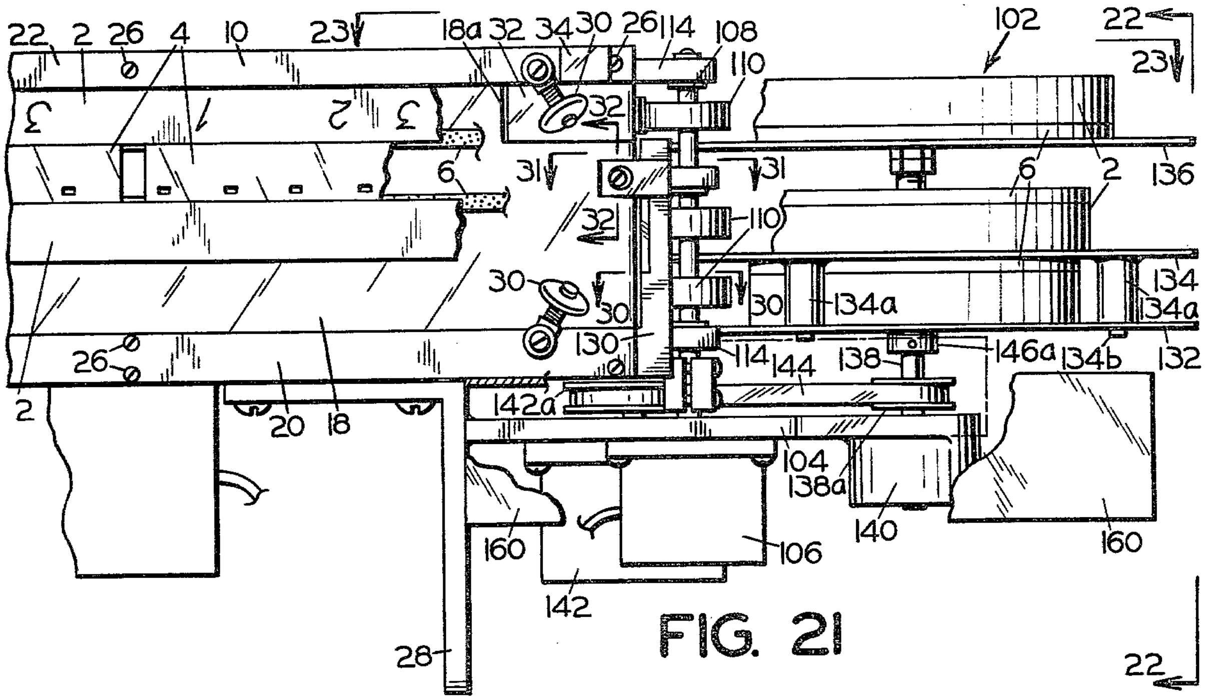
FIG. 21 is a front elevation view of an alternate arrangement of the right hand or discharge end of the film takeoff unit containing the film takeoff deflector and takeup reel.

In the alternate arrangement FIG. 21, the box-like frame 10 comprises the members 12 through 26 of FIG. 3A and is supported on the legs 28. As shown in FIG. 21 pressure rollers 30 are mounted on lower guide bar 20 and upper guide bar 22 providing for holding of carrier strip-film assemblies employing double carrier strips 2 or single carrier strip-film assemblies having the carrier strip on either the upper or the lower edge.

The power drive assembly 102 FIG. 21 is supported on a base 104 mounted on the legs 28. Mounted on base 104 is carrier strip drive motor 106 coupled to shaft 108 on which drive wheels 110 are positioned to align with the carrier strips 2 of the carrier strip-film assembly being used.

Figure 24:
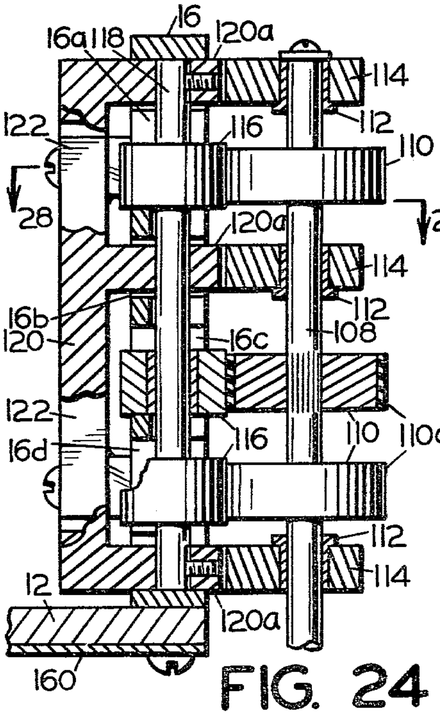
FIG. 24 is a vertical sectional elevation view along the line 24—24 of FIG. 23.
Figure 25:
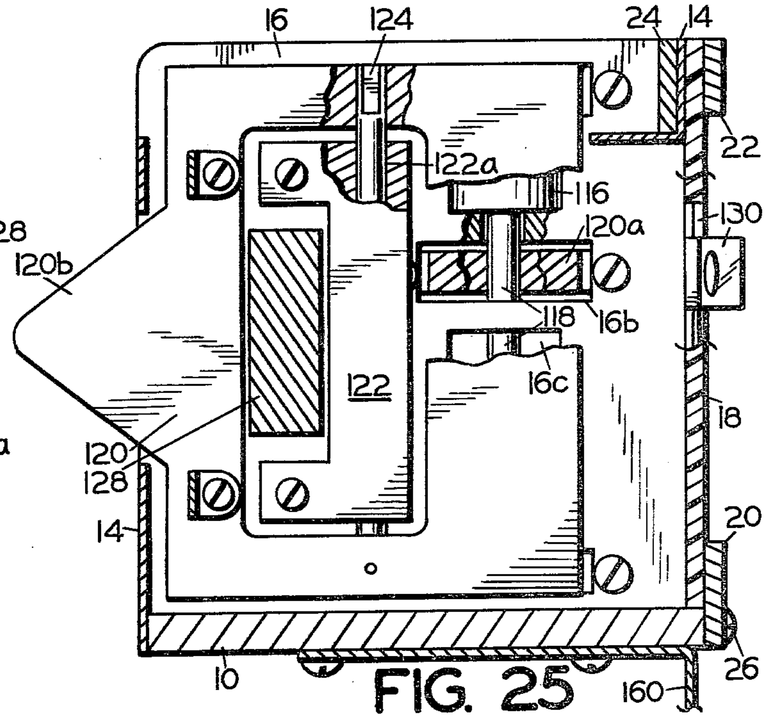
FIG. 25 is a fragmented sectional elevation view along the line 25—25 of FIG. 23.
Figure 26:
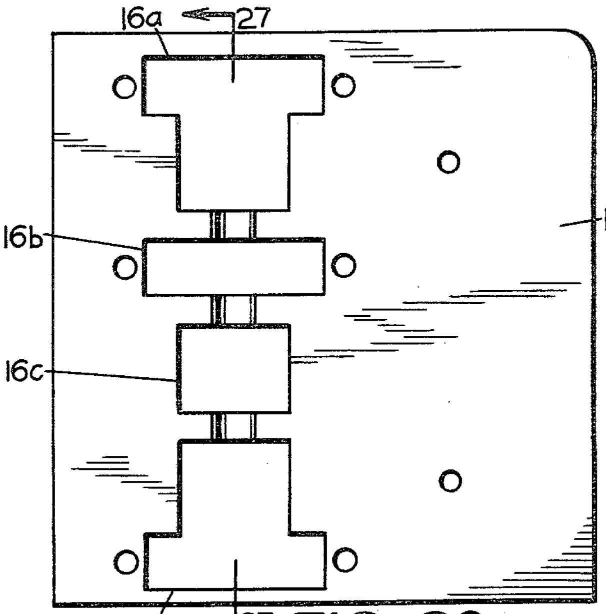
FIG. 26 is an end elevation view along the line 26—26 of FIG. 23.
Figure 27:
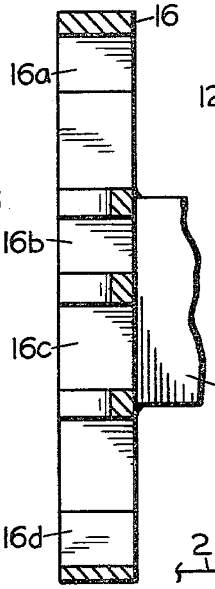
FIG. 27 is a sectional view along the line 27—27 of FIG. 26.

The drive shaft 108 is supported by bearings 112 FIG. 24 in brackets 114 directly mounted to the end member 16. The drive wheels 110 are provided with a resilient coating 110a and are in contact with pressure wheels 116 rotatively supported on fixed shaft 118. The shaft 118 is supported by pivotally mounted plate 120 having support brackets 120a extending therefrom. The end member 16 is provided with openings 16a, 16b, 16c and 16d FIG. 26 through which pressure wheels 116 and support brackets 120a project. Pivotal support for plate 120 is provided by pivot block 122 FIGS. 28 and 33 mounted on end member 16. The pivot block 122 is provided with a hole 122a through which shaft 124 is rotatively positioned, the shaft being retained in position by set screws in support brackets 120a. A tension spring 126 is connected at one end to member 120 with its opposite end connected to bracket 128 supported by end member 16 thereby maintaining pressure contact between pressure wheels 116 and drive wheels 110. The plate 120 is provided with a finger tab 120b extending through the angular member 14 of the box-like frame for release of pressure between the drive wheels 110 and pressure wheels 116.

The drive wheels 110 are positioned relative to the small radius corner 18d FIG. 31 to guide and maintain a sharp bend in the carrier strip FIG. 28 as explained in connection with guide roll 60 to cause stress in the adhesive and separate the adhesive from the film.

Figure 29:
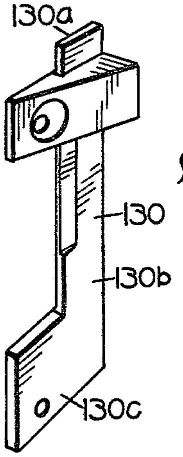
FIG. 29 is an isometric view of the alternate film deflector.

A film removing station at the discharge end of the box-like frame 10 is identical in structure to that explained in connection with FIG. 19, permitting wedge-shaped film deflector 130 FIG. 29 to be mounted relative to the discharge end of the translucent screen 18 and small radius corner 18d. The film deflector 130 is provided with an upward extending film guide 130a and a downward extending film guide 130b having an angular support member 130c permitting the film deflector to be supported at the wedge portion and at the member 130c. The front edges of the upward and downward film guides align with the front surface of the translucent screen 18. The downward extending film guide 130b is bevelled on the edge adjacent the translucent screen to assure passage of the edge of the film as it is carried forward by the carrier strips.

Figure 34:
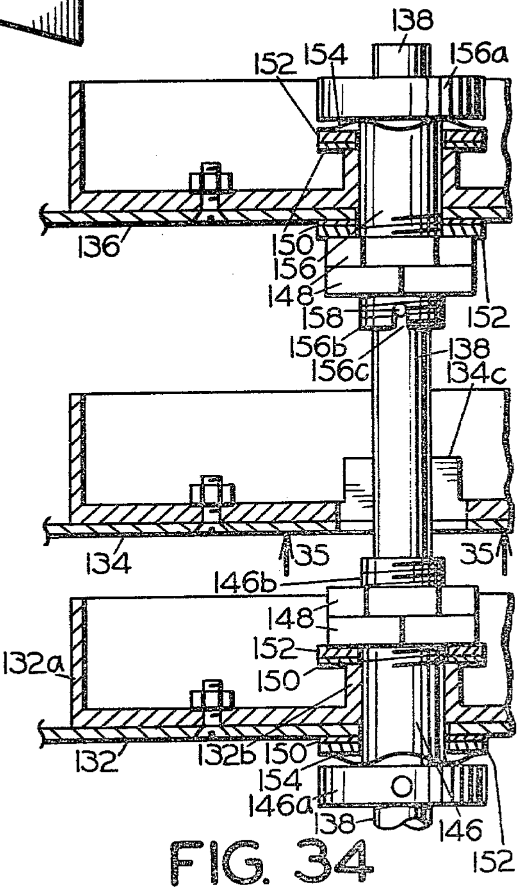
FIG. 34 is a partial sectional elevation view of the takeup reels along the line 34—34 of FIG. 23.

The takeup reels 132, 134 and 136 are mounted on takeup shaft 138 supported by a bearing assembly 140 on base 104 FIGS. 21 and 34. The shaft 138 is driven by a stall motor 142 connected through pulleys 142a, 138a and belt 144. Each of the takeup reels 132, 134 and 136 are provided with a central drum 132a, 134a and 136a respectively, about which the carrier strip is wound in operation. The shaft 138 is provided at the mounting point for the takeup reel 132 with a sleeve 146 having at its lower end an outwardly extending shoulder 146a and at its upper end a threaded portion 146b on which nuts 148 are mounted, the sleeve 146 being pin secured to the shaft 138. The takeup reel 132 is rotatively supported by the sleeve 146 on its hub 132b and driven by a friction clutch comprising friction washers 150, backup washers 152 and wave spring 154 between shoulder 146a and lower backup washer 152, the friction pressure being adjusted by means of nuts 148.

The upper takeup reel 136 is rotatively supported by its hub 136b on sleeve 156 having shoulder 156a and a threaded end 156b. The sleeve 156 is slip-fitted to the shaft 138 and driven by a pin 158 that engages notch 156c in the threaded end of the sleeve. The takeup reel 136 is friction driven by sleeve 156 through a clutch arrangement identical with that described for reel 132. The slip-fit of the sleeve 156 to shaft 138 permits removal of the upper reel 136.

Figure 22:
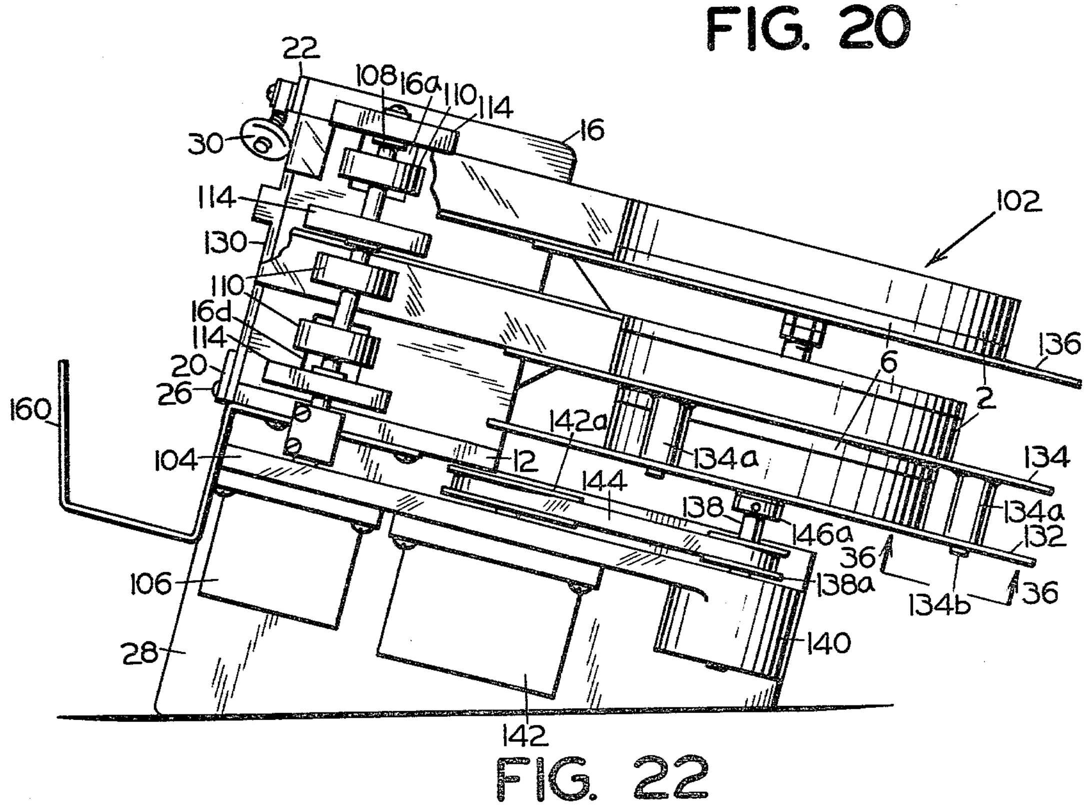
FIG. 22 is an end elevation view indicated by the line 22—22 of FIG. 21.
Figure 23:
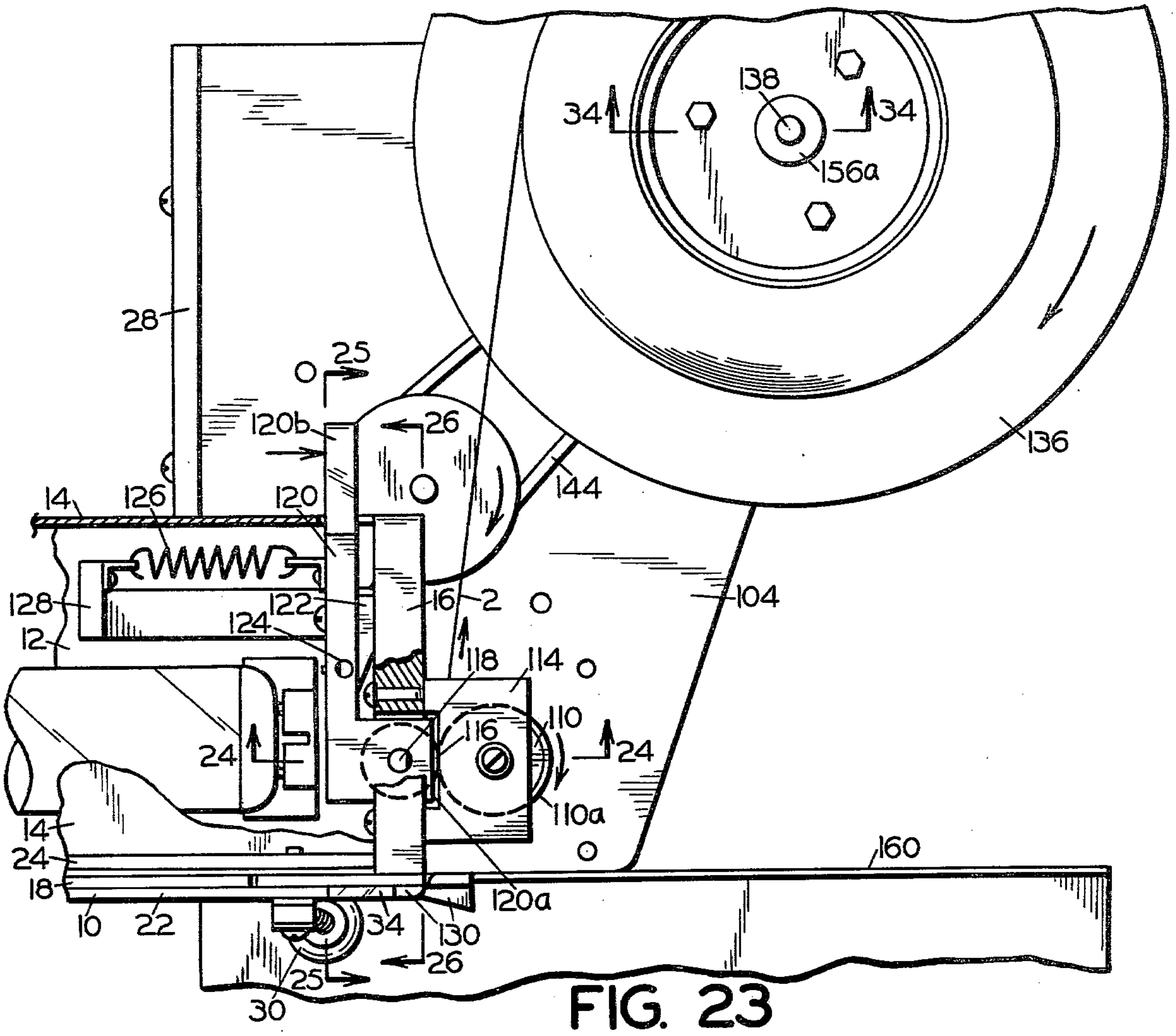
FIG. 23 is a fragmented plan view indicated by the line 23—23 of FIG. 21.
Figure 36:
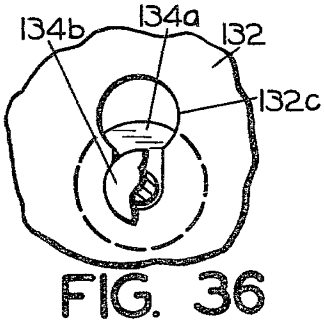
FIG. 36 is a fragmented bottom view of the lower takeup reel as indicated by the line 36—36 of FIG. 22.
Figure 35:
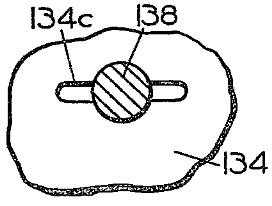
FIG. 35 is a fragmented bottom view of the takeup reel as indicated by line 35—35 of FIG. 34.

The intermediate takeup reel 134 is supported on and driven by lower takeup reel 132 by lugs 134a FIG. 22 provided with a shoulder pin 134b, adapted to engage takeup reel 132 through keyhole slots 132c FIG. 36. The central hub of takeup reel 134 is loose fitting on shaft 138 and is provided with a slot 134c FIG. 35 which provides for removal of reel 134 past drive pin 158.

The friction drives of takeup reels 132 and 136 maintain tension on each carrier-strip independent of the amount of carrier strip wound on each reel when two takeup reels are being used for a double carrier strip-film assembly.

The takeup reel 134 when used in conjunction with upper takeup reel 136 makes use of the clutch of reel 132 to provide for the relative amount of carrier strip wound on the respective takeup reels.

OPERATION

Single Carrier Strip-Film Assembly

In operation, the reel 40 containing the carrier strip-film assembly made up of the carrier strip 2, film 4 and adhesive 6 FIG. 3B is placed on the spindle 36 at the left end of the film take-off unit. The carrier strip-film assembly is then passed around roller 38, across the translucent screen 18 with the carrier strip 2 passing under the pressure rollers 30. The lead end of the carrier strip 2 is passed over the end of the translucent screen 18 which provides a support 18c and then around the discharge end corner 18d of the support 18c FIG. 14 between the vertical film guide 64a of the deflector 64, behind guide roller 60 FIG. 5, to the take-up reel 54 to be wound in a counterclockwise direction when viewed from above.

By means of the foot control cable 86 the power drive is energized to draw the carrier strip 2 in the downstream direction from the left end of FIG. 3B to the right end of FIG. 3A. The motion of the carrier strip causes the rollers 30 to force the upper edge of the carrier strip 2 into engagement with the guide bar 22. The friction of the carrier strip 2 under the rollers in combination with the roller friction provides tension for the carrier strip. Tension may be varied by the angle of the roller axis. The operator stops the movement of the film strip as desired for viewing the films for coordination with the previously printed pictures.

Figure 14:
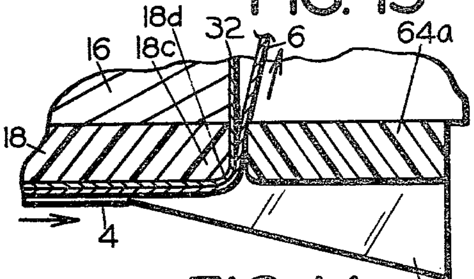

As the carrier strip-film assembly continues to move from left to right, the film contacts the deflector 64, FIG. 14, at which time the plane of the film is substantially parallel with the plane of the carrier strip. Continued movement of the carrier strip causes the film to be deflected outwardly by the deflector. The outward deflection increases the bending resistance of the film in the plane of the carrier strip 2.

Figure 15:
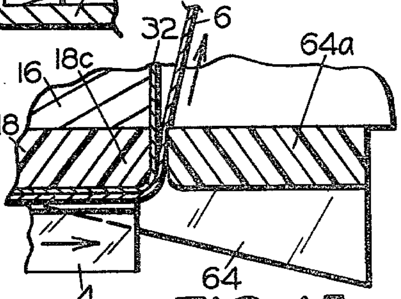
FIG. 14, 15 and 16 are fragmented cross sectional views along the line 14—14 of FIG. 3A showing the sequential events occurring in the removal of the film.
Figure 16:
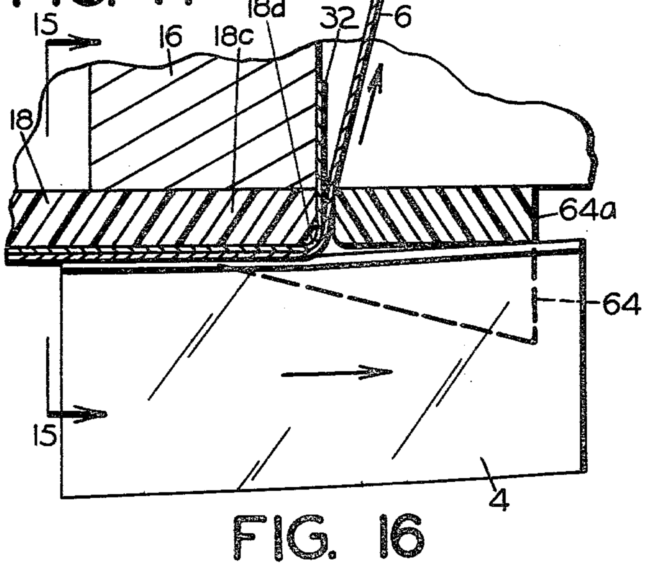
Figure 17:
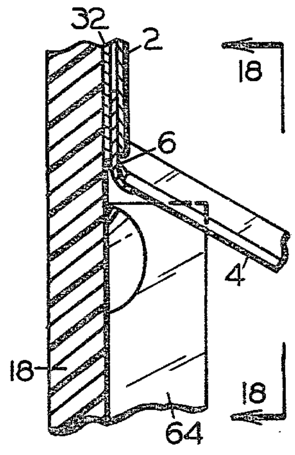
FIG. 17 is a fragmented cross section along the line 17—17 of FIG. 16.

When the lead edge of the film 4 arrives at the point at which the carrier strip 2 is bent around corner 18d, FIG. 15, the bending resistance of the film 4 in combination with the stress in the adhesive due to the sharp bend overcomes the bonding strength of the adhesive as the carrier strip 2 is moved around the corner 18d releasing the film from the carrier strip 2. Further forward movement of the carrier strip-film assembly continues to disengage the carrier strip adhesive from the film 4 as shown in FIG. 16 and deflect the film outward as shown in FIG. 17. The film 4 is prevented from following the carrier strip around corner 18d by its resistance to bending and contact with the film guide 64a of deflector 64, until the film is fully free of the adhesive and the carrier strip 2, where it is picked off by the operator or dropped into a container for later retrieval.

The operator combines the released film with the proper picture and places it in customer envelopes for return.

Double Carrier Strip-Film Assembly

The operating procedure and principle of the film removal in the alternate arrangement shown in FIGS. 20 through 36 are identical with that explained for the single carrier strip-film assembly except for details in connection with the power drive assembly 102.

Figure 28:
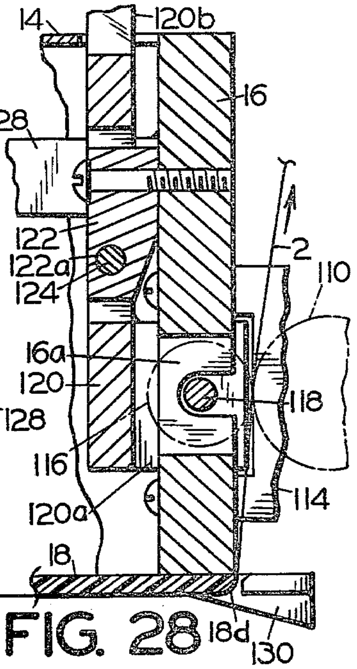
FIG. 28 is a plan sectional view along the line 28—28 of FIG. 24.
Figure 31:
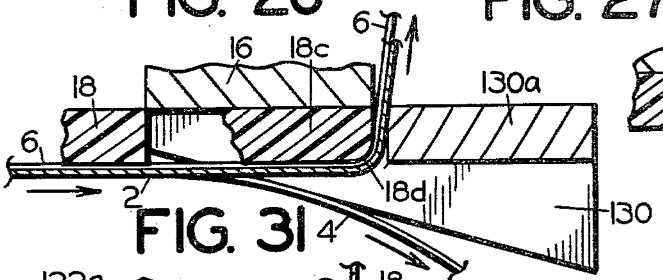
FIG. 31 is a partial sectional view along the line 31—31 of FIG. 21.
Figure 30:
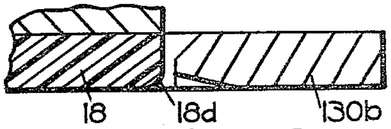
FIG. 30 is a partial sectional view along the line 30—30 of FIG. 21.
Figure 33:
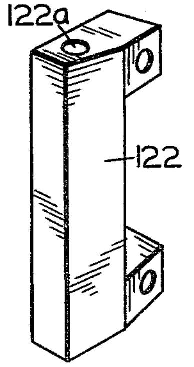
FIG. 33 is an isometric view of the pressure roller support.
Figure 32:
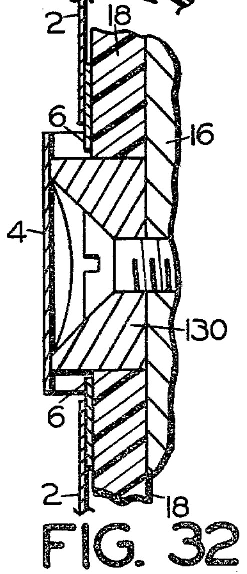
FIG. 32 is a fragmented sectional view along the line 32—32 of FIG. 21.

With the carrier strip-film assembly passed across the translucent screen 18 and under pressure rollers 30 the feed ends of the carrier strips 2 are passed around the discharge end small radius corner 18d of the support 18c FIGS. 28 and 31 between the vertical guides 130a and 130b of deflector 130. The carrier strips are then passed between the drive wheels 110 and the pressure wheels 116 by releasing the pressure between the drive wheels and the pressure wheels by applying pressure to the finger tab 120b, after which the finger tab 120b is released.

When processing narrow film such as 16 millimeter, the lower carrier strip is fed onto intermediate takeup reel 134 to be wound in a clockwise direction viewed from above. The upper carrier strip 2 is fed onto upper takeup reel 136 to be wound in a clockwise direction viewed from above. When wider film such as 35 millimeter, is processed the intermediate takeup reel is removed from the shaft 138 and the lower carrier strip 2 is fed onto reel 132 with the upper carrier strip fed onto reel 136.

The foot control cable 86 in the alternate arrangement connects to the power drive motor 106 providing a uniform driving speed for the carrier strip-film assembly past the translucent viewing screen. A separate power cable energizes the takeup reel motor 142. The operator stops the movement of the film strip as desired for viewing and for coordination with the previously printed pictures.

As the film 4 approaches the small radius corner 18d the film deflector 130 produces a tension on the film which stresses the bond between the film 4 and bonding material 6 to release the film from the bonding material. As the forward travel continues the carrier strips are bent around corner 18d providing assurance of the release of the film from the bonding material. Continued travel of the carrier strips deflects the film outwardly until completely released from the carrier strips 2 where it is picked off by the operator or dropped into the retrieval container 160 FIG. 22.

Having thus described my invention, I claim:

1. Apparatus for removing a plurality of photographic films from an assembly of films secured adhesively along one of their longitudinal edges to an elongated, flexible carrier strip, whereby the central portions of the films are spaced from the carrier strip, the apparatus comprising:

(a) a frame having an outer support surface for supporting the film and the strip assembly during movement of the assembly longitudinally in a film-removal direction, the support surface having a film-removal end, (b) a film deflector mounted on the frame and having a film-engaging outer surface and an inner end disposed longitudinally rearward of the film-removal end of the support surface, the outer surface of the deflector extending forwardly of the film-removal end of the support surface of the frame angularly outward with respect to the plane of the support surface of the frame, (c) the film deflector being arranged to engage only the film component of the film and strip assembly, (d) the film-removal end of the support surface of the frame laterally adjacent the deflector forming a carrier strip bending edge for separating the carrier strip from the films.

2. The apparatus of claim 1 including a film support extending laterally from the deflector substantially in the plane of the support surface of the frame and spaced forwardly of the bending edge of the support surface for supporting film downstream from the carrier strip as the latter is bent around the bending edge and removed from the films.

3. The apparatus of claim 1 including:

(a) a film and carrier strip assembly take-off reel mounted on the frame upstream from the film-removal end, (b) a carrier strip take-up reel mounted on the frame downstream from the film-removal end, and (c) reel drive means on the frame engaging the take-up reel for rotating the latter.

4. The apparatus of claim 1 including film and carrier strip assembly guide means on the frame for aligning the film longitudinally with the deflector and the carrier strip longitudinally with the bending edge.

5. The apparatus of claim 1 including:

(a) a film support extending laterally from the deflector substantially in the plane of the support surface of the frame and spaced forwardly of the bending edge of the support surface for supporting film downstream from the carrier strip as the latter is bent around the bending edge and removed from the films, (b) a film and carrier strip assembly take-off reel mounted on the frame upstream from the film-removal end, (c) a carrier strip take-off reel mounted on the frame downstream from the film-removal end, (d) reel drive means on the frame engaging the take-up reel for rotating the latter, and (e) film and carrier strip assembly guide means on the frame for aligning the film longitudinally with the deflector and the carrier strip longitudinally with the bending edge and take-up reel.

6. The apparatus of claim 1 wherein the films are secured adhesively along both of their opposite longitudinal edges to a pair of laterally spaced elongated flexible carrier strips and the film-removal end of the support surface of the frame laterally adjacent both sides of the deflector form a pair of carrier strip bending edges for separating the carrier strips from the films, and the apparatus includes a film support extending laterally from opposite sides of the deflector substantially in the plane of the support surface of the frame and spaced forwardly of the bending edges of the support surface for supporting film downstream from the carrier strips as the latter are bent around the bending edges and removed from the films.

7. The apparatus of claim 1 wherein the films are secured adhesively along both of their opposite longitudinal edges to a pair of laterally spaced elongated flexible carrier strips and the film-removal end of the support surface of the frame laterally adjacent both sides of the deflector form a pair of carrier strip bending edges for separating the carrier strips from the films, and the apparatus includes:

(a) a film and carrier strip assembly take-off reel mounted on the frame upstream from the film-removal end, (b) a pair of carrier strip take-up reels mounted on the frame downstream from the film-removal end, and (c) reel drive means on the frame engaging the take-up reels for rotating the latter.

8. The apparatus of claim 7 including strip drive means on the frame intermediate the bending edges of the support surface and the take-up reels arranged to engage the carrier strips for pulling the film and carrier strip assembly in the downstream direction, the reel drive means on the frame frictionally engaging the take-up reels.

9. The apparatus of claim 1 wherein the films are secured adhesively along both of their opposite longitudinal edges to a pair of laterally spaced elongated flexible carrier strips and the film-removal end of the support surface of the frame laterally adjacent both sides of the deflector form a pair of carrier strip bending edges for separating the carrier strips from the films, and the apparatus includes:

(a) a film support extending laterally from opposite sides of the deflector substantially in the plane of the support surface of the frame and spaced forwardly of the bending edges of the support surface for supporting film downstream from the carrier strips as the latter are bent around the bending edges and removed from the films, (b) a film and carrier strip assembly take-off reel mounted on the frame upstream from the film-removal end, (c) a pair of carrier strip take-up reels mounted on the frame downstream from the film-removal end, (d) strip drive means on the frame intermediate the bending edges of the support surface and the take-up reels arranged to engage the carrier strips for pulling the film and carrier strip assembly in the downstream direction, (e) reel drive means on the frame frictionally engaging the take-up reels for rotating the latter, and (f) film and carrier strip assembly guide means on the frame for aligning the film longitudinally with the deflector and the carrier strips longitudinally with the bending edges and take-up reels.

* * * * *